US007561977B2

(12) United States Patent
Horst et al.

(10) Patent No.: US 7,561,977 B2
(45) Date of Patent: Jul. 14, 2009

(54) TOTAL HOME ENERGY MANAGEMENT SYSTEM

(75) Inventors: Gale Richard Horst, Watervliet, MI (US); Jiannong Zhang, St. Joseph, MI (US); Andriy Dmytrovych Syvokozov, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 35 days.

(21) Appl. No.: 10/460,885

(22) Filed: Jun. 13, 2003

(65) Prior Publication Data
US 2003/0233201 A1    Dec. 18, 2003

Related U.S. Application Data

(60) Provisional application No. 60/389,013, filed on Jun. 13, 2002.

(51) Int. Cl.
*G01R 21/00*  (2006.01)
*G06F 17/40* (2006.01)

(52) U.S. Cl. .............................. 702/62; 702/60; 702/61; 700/295

(58) Field of Classification Search .................... 702/62, 702/57, 60, 61, 64, 65, 122, 124, 126, 183, 702/187, 188; 700/22, 286, 291–293, 295–297, 700/412; 324/142, 103 R, 141; 307/125, 307/126, 116, 35, 38, 39; 340/870.01, 870.02, 340/870.16, 500, 635, 636.12, 637, 657, 340/3.1; 705/412
See application file for complete search history.

(56) References Cited

U.S. PATENT DOCUMENTS 3,925,680 A    12/1975  Dixon
4,090,088 A    5/1978  McMahon et al. ............ 307/38
4,168,491 A    9/1979  Phillips et al.
4,247,786 A    1/1981  Hedges ........................ 307/35
4,293,915 A    10/1981  Carpenter et al.
4,336,462 A    6/1982  Hedges et al.
4,472,640 A    9/1984  Elmer (Continued)

FOREIGN PATENT DOCUMENTS

DE    19541869 C1    1/1997

(Continued)

OTHER PUBLICATIONS

"Utility Control Algorithm", Jan. 1, 1986, vol. 28, issue 8, pp. 3657-3660.*

(Continued)

*Primary Examiner*—Hal D Wachsman
(74) *Attorney, Agent, or Firm*—Robert A. Bacon; Michael D. LaFrenz

(57) ABSTRACT

A system that facilitates and implements energy savings decisions by a home owner. The system will provide a mechanism to reduce the peak level of energy demand. A controller in logical communication with energy consuming appliances responds to request for energy from energy consuming appliances and devices by permitting or curtailing energy supply to the appliances or devices based on evaluation of a plurality of logical considerations. The controller may be operated to provide energy to fewer than all of the energy requesting appliances to reduce the energy demand on an energy supply source, including the instantaneous peak demand.

26 Claims, 7 Drawing Sheets

U.S. PATENT DOCUMENTS

| | | | |
|---|---|---|---|
| 4,476,398 A | 10/1984 | Hallam | |
| 4,612,619 A | 9/1986 | Culp | |
| 4,771,185 A | 9/1988 | Feron et al. | |
| 4,819,180 A | 4/1989 | Hedman et al. | 700/291 |
| 4,829,159 A | 5/1989 | Braun et al. | |
| 4,847,781 A | 7/1989 | Brown, III et al. | 700/296 |
| 4,847,782 A | 7/1989 | Brown, Jr. et al. | 700/296 |
| 4,998,024 A | 3/1991 | Kirk et al. | |
| 5,017,799 A | 5/1991 | Fishman | 307/34 |
| 5,168,170 A | 12/1992 | Hartig | 307/35 |
| 5,272,585 A | 12/1993 | Gibbs | |
| 5,359,540 A | 10/1994 | Ortiz | |
| 5,424,903 A | 6/1995 | Schreiber | |
| 5,436,510 A | 7/1995 | Gilbert | |
| 5,481,140 A * | 1/1996 | Maruyama et al. | 307/11 |
| 5,483,656 A | 1/1996 | Oprescu et al. | |
| 5,502,339 A | 3/1996 | Hartig | 307/31 |
| 5,506,790 A | 4/1996 | Nguyen | |
| 5,543,667 A | 8/1996 | Shavit et al. | 307/39 |
| 5,544,036 A | 8/1996 | Brown, Jr. et al. | 364/145 |
| 5,572,438 A * | 11/1996 | Ehlers et al. | 700/295 |
| 5,579,201 A | 11/1996 | Karageozian | |
| 5,581,132 A | 12/1996 | Chadwick | 307/38 |
| 5,659,601 A | 8/1997 | Chelog | |
| 5,754,445 A | 5/1998 | Jouper et al. | |
| 5,761,083 A | 6/1998 | Brown, Jr. et al. | |
| 5,831,345 A | 11/1998 | Michaud | |
| 5,844,326 A | 12/1998 | Proctor et al. | |
| 5,880,677 A | 3/1999 | Lestician | |
| 6,018,690 A | 1/2000 | Saito et al. | |
| 6,018,726 A | 1/2000 | Tsumura | |
| 6,028,977 A | 2/2000 | Newsome | |
| 6,111,762 A | 8/2000 | Igarashi et al. | 363/21.16 |
| 6,169,964 B1 | 1/2001 | Aisa et al. | |
| 6,177,739 B1 | 1/2001 | Matsudaira et al. | 307/125 |
| 6,181,985 B1 | 1/2001 | O'Donnell et al. | |
| 6,216,956 B1 * | 4/2001 | Ehlers et al. | 236/47 |
| 6,301,674 B1 | 10/2001 | Saito et al. | |
| 6,329,616 B1 | 12/2001 | Lee | |
| 6,369,643 B1 | 4/2002 | Lee et al. | 327/544 |
| 6,487,509 B1 | 11/2002 | Aisa | 702/62 |
| 6,493,643 B1 | 12/2002 | Aisa | 702/60 |
| 6,519,509 B1 * | 2/2003 | Nierlich et al. | 700/286 |
| 6,583,521 B1 * | 6/2003 | Lagod et al. | 307/70 |
| 6,590,304 B1 | 7/2003 | Manning et al. | |
| 6,621,179 B1 * | 9/2003 | Howard | 307/38 |
| 6,631,622 B1 | 10/2003 | Ghent et al. | 62/231 |
| 6,633,823 B2 * | 10/2003 | Bartone et al. | 702/57 |
| 6,681,154 B2 | 1/2004 | Nierlich et al. | 700/286 |
| 6,718,214 B1 | 4/2004 | Schoettle et al. | |
| 6,741,442 B1 | 5/2004 | McNally et al. | |
| 6,745,106 B2 * | 6/2004 | Howard et al. | 700/276 |
| 6,891,478 B2 | 5/2005 | Gardner | |
| 6,940,272 B2 | 9/2005 | Niv | |
| 7,034,707 B2 | 4/2006 | Aisa | |
| 7,280,893 B2 | 10/2007 | Spool et al. | |
| 7,324,876 B2 | 1/2008 | Ying | |
| 2002/0019758 A1 | 2/2002 | Scarpelli | 705/7 |
| 2002/0019802 A1 | 2/2002 | Malme et al. | 705/37 |
| 2003/0036822 A1 * | 2/2003 | Davis et al. | 700/295 |
| 2003/0187550 A1 | 10/2003 | Wilson et al. | |
| 2003/0233201 A1 | 12/2003 | Horst et al. | |
| 2004/0043754 A1 | 3/2004 | Whewell | |
| 2004/0078154 A1 | 4/2004 | Hunter | |
| 2004/0133314 A1 * | 7/2004 | Ehlers et al. | 700/276 |
| 2004/0235451 A1 | 11/2004 | Whewell et al. | |
| 2005/0116543 A1 | 6/2005 | Merdjan | |
| 2005/0280969 A1 | 12/2005 | Reynolds | |
| 2005/0280970 A1 | 12/2005 | Reynolds | |

FOREIGN PATENT DOCUMENTS

| | | |
|---|---|---|
| DE | 19824168 A1 | 2/1999 |
| EP | 0620631 A1 | 10/1994 |
| WO | 02/27687 A1 | 4/2002 |
| WO | 03094321 A1 | 11/2003 |

OTHER PUBLICATIONS

Household Response to Incentive Payment for Load Shifting: A Japanese Time-of-Day Electricity Pricing Experiment.:, Isamu et al, Energy Journal, 21, 1, 73, Jan. 2000.

Asian Electronics Ltd., Glossary, 2003, pp. 1-6.

http://www.hrm.uh.edu/docs/pdf/Nextel%20Plans.pdf, Oct. 11, 2001, 8 pages.

Merriam Webster's Dictionary of Synonyms, 1984, Merriam-Webster, Incorporated, p. 13.

* cited by examiner

TOTAL HOME ENERGY MANAGEMENT SYSTEM

This application is a non-provisional of provisional application 60/389,013, filed on Jun. 13, 2002, the entire contents of which are hereby incorporated by reference.

BACKGROUND OF THE INVENTION

The present invention relates generally to managing energy consumption of home energy consuming devices through an energy demand controller.

Just about all homes employ energy consuming appliances and other devices. Although each appliance in a home usually is operated independently from one another, each draws energy from the home energy distribution system. In turn, each home draws energy from the energy distribution system of an energy provider. During certain times of the day, such as morning or early evening, the draw on the energy provider energy distribution system is so great that the energy provider either brings on line additional power plants or buys additional power from other suppliers. This peak energy demand creates additional costs for the energy provider. The energy provider passes these additional costs onto each consumer.

The increased cost has several causes. The energy supplier must build, manage, supply and maintain facilities capable of producing and handling the maximum amount of power required during peak times. This includes additional production facilities that are idle during non-peak times and therefore decrease both the dollar and energy efficiency of the overall system. Furthermore, since some of these facilities need rapid startup to avoid brown out conditions, they may be of a type that is less efficient than other facilities even while operating at peak capacity. Additionally, all components of the energy delivery system, including wires and transformers must be capable of handling the peak load and therefore are more expensive and less efficient than they would be if the peak load were closer to the average load they experience.

Energy providers, appliance manufacturers, consumers, and the government each desire to reduce peak power demands and save energy and cost. For example, some energy providers provide cost savings incentives for consumers who volunteer not to run their appliances during peak energy demand. Most appliance manufacturers work towards producing more efficient appliances. Consumers may elect not to run their dishwasher, clothes washer, or clothes dryer in the morning or early evening. The government enacts laws to regulate the behavior of energy providers, appliance manufacturers, and consumers.

Conventionally, the decision on how to save energy has largely remained in the hands of energy providers, appliance manufacturers, and the government. A main reason for this is that consumers lack detailed control over the management of their collective home energy use. A secondary reason for this is that energy providers and others have no way of receiving control from the homes of individual customers over the energy demand from the homes of individual customers.

The traditional response to this problem, building more production capacity, operating less efficient peak plants at time of peak demand, and building an energy distribution infrastructure capable of handling the increasing peak demand is costly, not only in terms of pollution and consumption of non-renewable resources, but also in terms of allocation of monetary resources and land. Time of use pricing and setback programs are only as effective as the ability of consumers of energy to respond and brown outs and mandatory curtailments during peak times can be draconian and economically devastating on businesses affected.

However, it has been demonstrated that when consumers are provided with information and incentives to reduce energy consumption, some will modify their appliance purchasing behavior as well as their energy usage behavior. Energy pricing and curtailment programs encourage voluntary demand side management, but the consumer needs more tools to take advantage of such programs.

What is needed is an energy management system that encourages and facilitates energy and cost efficiency by providing a home owner with more information and control over energy savings.

SUMMARY OF THE INVENTION

Recent trends in appliances include more electronic sensing and control of appliance functionality as well as an increased capability to exchange data between an appliance and computers and other devices external of the appliance. As a result of the trend towards electronic control, many methods and devices are well known to remotely communicate with appliances to sense, monitor and control them. Many methods and devices are also known to provide devices, such as smart modules built into electrical sockets or disposed along the power distribution system to an appliance or other energy consuming device, to selectively supply or curtail power to that appliance or device. Such devices and methods may include means for detecting whether an appliance is operating and even for determining what type of appliance or device is drawing power and gathering diagnostic information from the appliance or device. This presents an unobvious opportunity to facilitate residential energy management.

In light of the above noted problems, the invention provides a system that distributes the primary decision making ability over energy savings to a home owner. When implemented, this system will reduce the level of energy demand on an energy supply source.

A specific aspect to the system is that there may be a plurality of inputs into a device that may make curtailment decisions to produce a variety of outputs to one or more energy consuming devices that are selected from at least two choices to control two curtailment levels. As part of the system, a controller may be placed in communication with energy consuming appliances. Request for energy may be received at the controller from the plurality of energy consuming appliances. Each request for energy may originate from an energy requesting appliance. The controller may be operated to provide energy to fewer than all of the energy requesting appliances to reduce a level of energy demand on an energy supply source.

Another aspect of this invention is that a controller in logical communication with an appliance may make an intelligent decision about control of the appliance after balancing a plurality of inputs selecting inputs selected from a group consisting of a power rate schedule, household status, personal preferences, curtailment requests from a power supplier, power requests and usage from other household appliances, power usage grants from a power supplier.

These and other objects, features, and advantages of the present invention will become apparent upon a reading of the detailed description and a review of the accompanying drawings. Specific embodiments of the present invention are described herein. The present invention is not intended to be limited to only these embodiments. Changes and modifications can be made to the described embodiments and yet fall within the scope of the present invention.

DETAILED DESCRIPTION OF THE PREFERRED EMBODIMENTS

Figure 1:
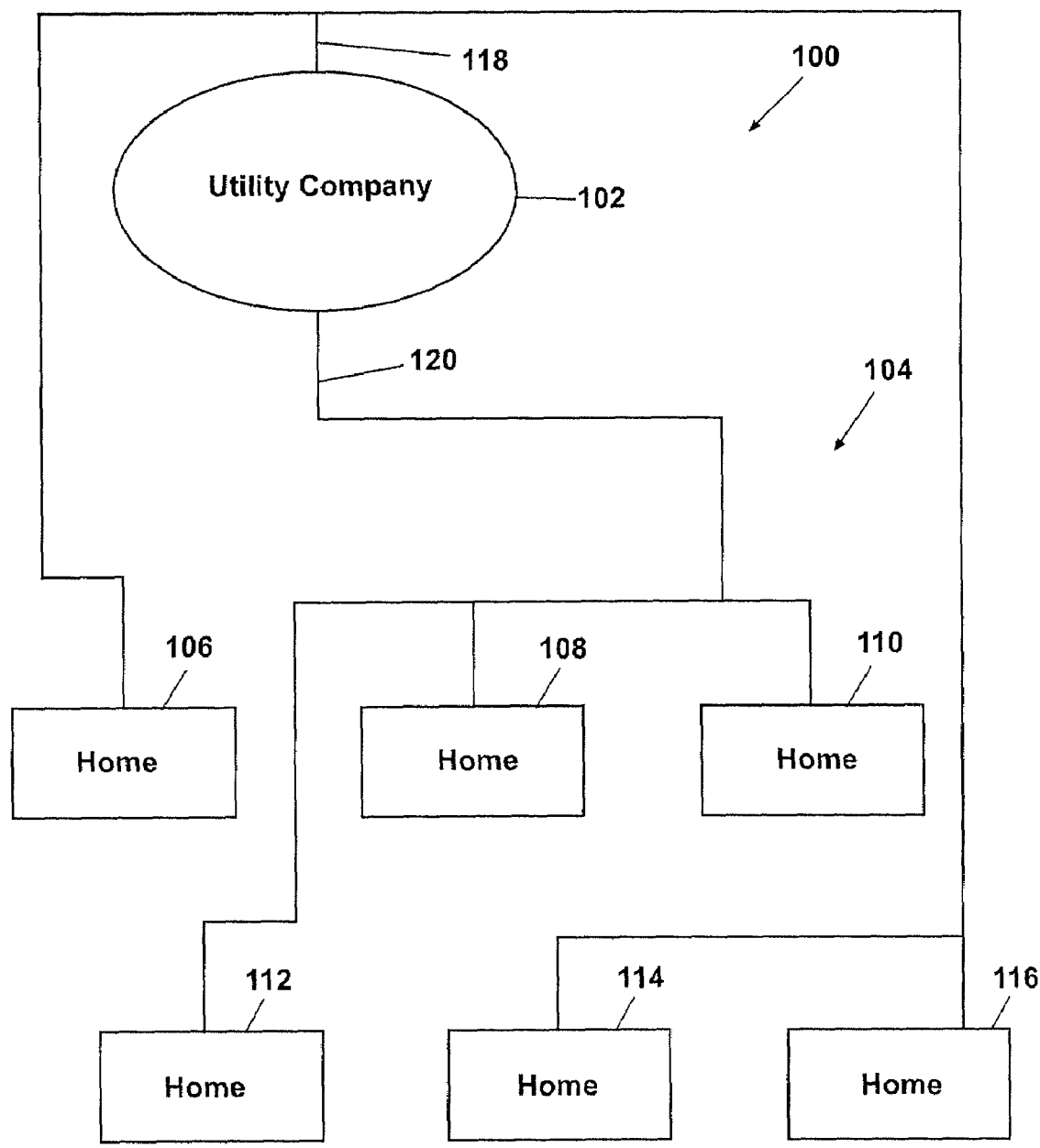
FIG. 1 is a schematic diagram of a regional energy distribution system.

FIG. 1 is a schematic diagram of an energy distribution system 100. Included within the energy distribution system 100 may be an energy provider 102, such as a utility company, and a community 104 of homes, such as home 106, home 108, home 110, home 112, home 114, and home 116. The energy provider 102 may provide a supply of energy and be responsible for the delivery of that energy to homes 106-116. Each home 106-116 may include various energy consuming devices that utilize energy to operate. Examples of energy consuming devices include household appliances such as washers, dryers, ovens, dishwashers, refrigerators, freezers, hot water heaters, heating and cooling appliances, humidity control appliances, as well as lights, thermostats, ventilation and cooling infrastructure, and other pumps, heaters.

To deliver energy to one or more homes, the energy distribution system 100 may further include a power grid 118, connected to home 106, home 114, and home 116, and a power grid 120, connected to home 108, home 110, and home 112. The acceptance by a home 106-116 of delivered energy may be thought of as the energy demand of that home. The collective of the energy demand for homes 106-116 within the community 104 may be thought of as the energy demand of the community 104.

Figure 2A:
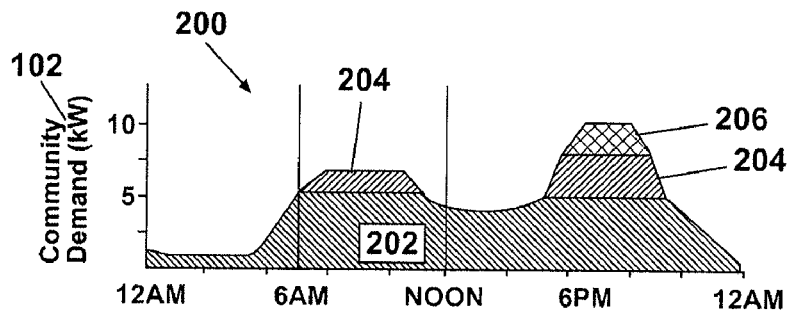
FIG. 2A is a graph illustrating a typical electrical averaged home energy demand of a residential community over a twenty-four-hour operating period.

When a home 106-116 accepts delivered energy, the consumer may incur a charge from the energy provider 102 for that energy at the going rate of the energy for the community 104. The cost for this energy typically depends upon the time of day. FIG. 2A is a graph illustrating a typical off-peak and on-peak electrical averaged home energy demand of the community 104 over a twenty-four-hour operating period. The graph illustrates an example of a time-varying cost for the energy and a public demand by the community 104 for the energy.

From midnight to about six in the morning, the demands for energy by average home in the community 104 may be low, such that off-peak energy rates (or off-peak energy period) 202 may apply. From about six in the morning to about eleven in the morning, demands for energy by that home may be high, such that on-peak energy rates (or on-peak energy period) 204 may apply. The average home energy demand may drop in the afternoon to below about 5.0 kilowatts (kW) per hour and pick up around five in the afternoon. From around five in the afternoon to around nine in the evening, the home demands for energy again may be high. These high demands may increase the cost of energy to on-peak energy rates 204. The demands for electrical energy by the average of homes in the community 104 may be so great that special on-peak energy rates 206 may apply. For example, energy used during off-peak may cost the consumer in United States dollars around 2¢ to 3¢ per kilowatt-hour (kWh), while on-peak energy may cost anywhere from 6¢ per kWh to 50¢ or more per kWh.

Figure 2B:
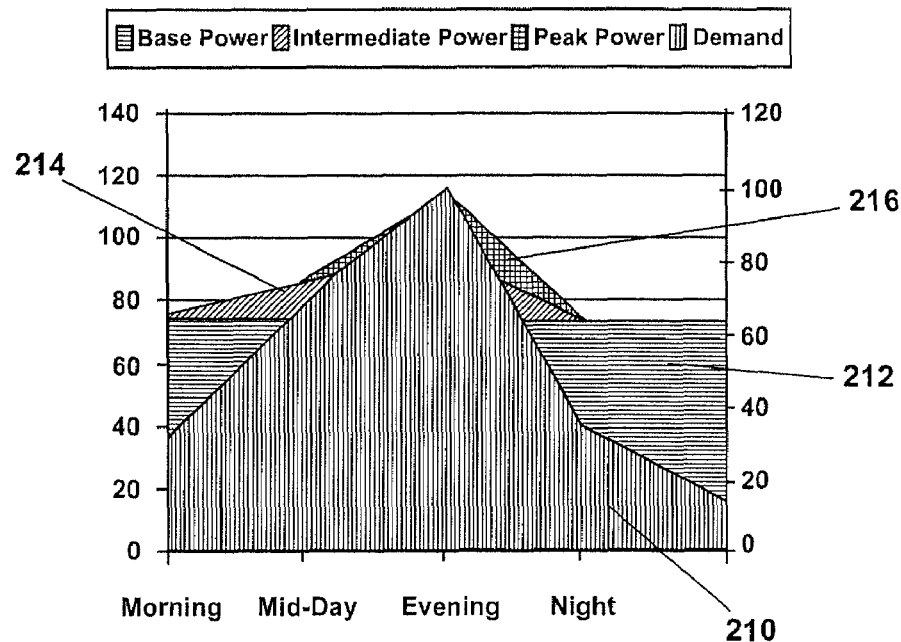
FIG. 2B is a graph illustrating an example of the total electrical demand on a power supplier.

FIG. 2b illustrates another example of total energy demand on a power supplier which includes residential and commercial power consumption. In this example, the power demand 210 increases throughout the day to a peak in the evening, then drops rapidly until the next morning. The demand is met by having a supply system based on base power 212, intermediate power 214 and peak power 216. Peak power is more expensive to provide than intermediate power, and intermediate power is more expensive than base power. As shown in FIG. 2b, the peak demand drive inefficiencies including the need to generate more expensive peak power and the need to have a power delivery system capable of handling the peak power. Therefore, it is desirable to empower the consumer to shift demand from peak time to non-peak time.

Figure 2C:
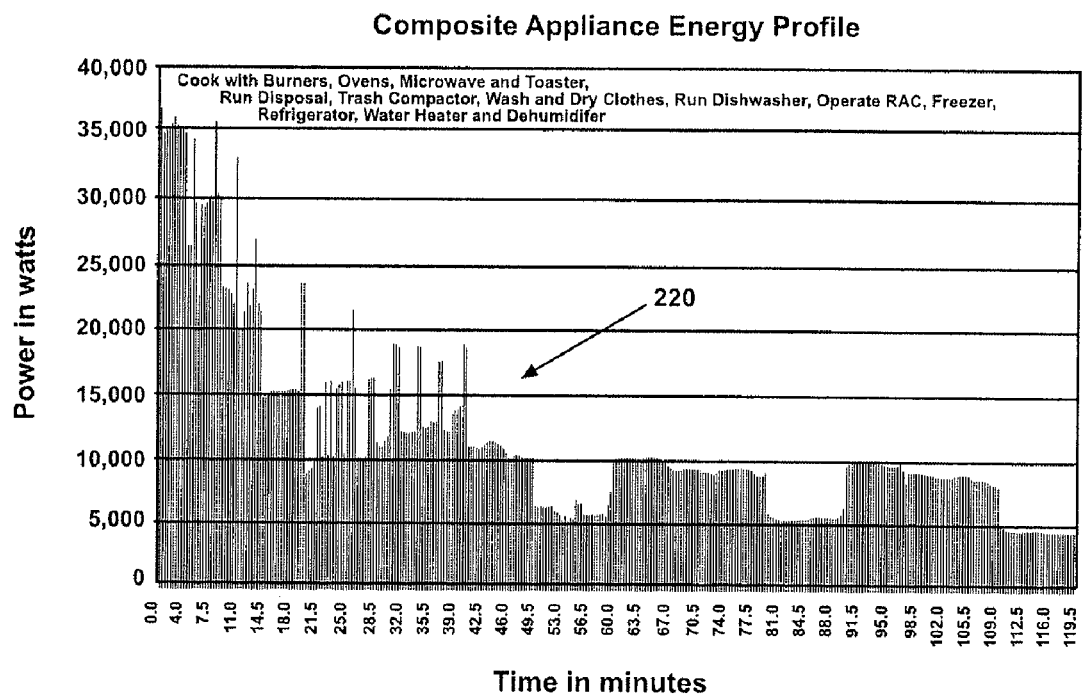
FIG. 2C is a graph illustrating an example of the total electrical demand on a power supplier when several appliances in a single household are started simultaneously.
Figure 2D:
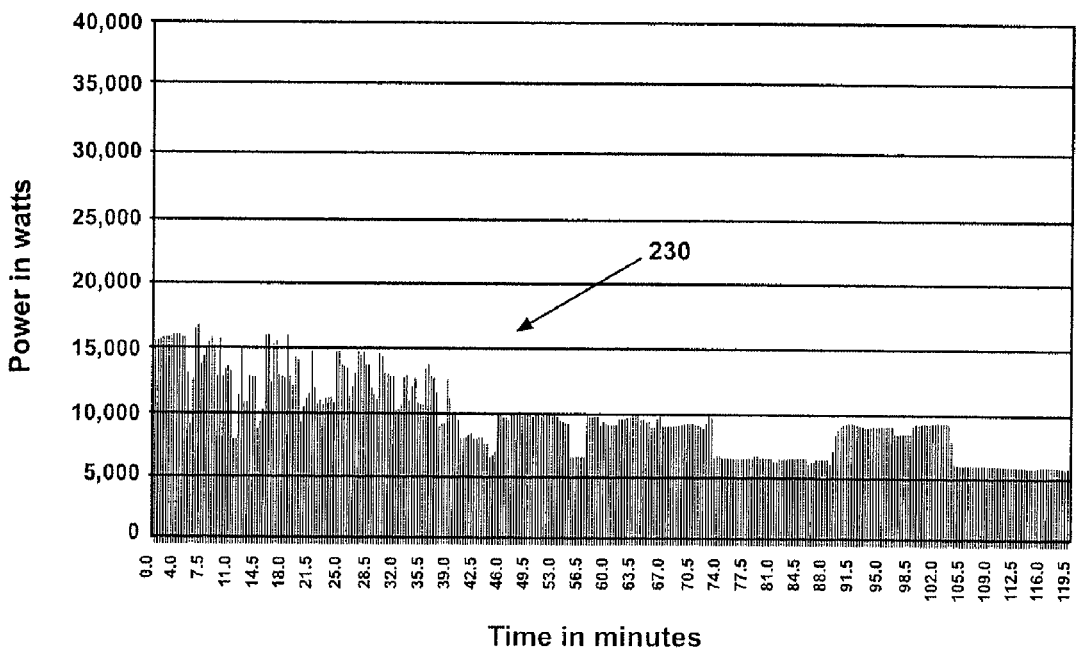
FIG. 2D is a graph illustrating the total electrical demand on a power supplier when the starting time of the same appliances in a single household are staggered.

FIG. 2C illustrates the instantaneous power demand 220 that occurs when all major appliances in a home are started simultaneously, as compared with FIG. 2D, which illustrates the instantaneous power demand 230 which occurs when the starting times are staggered. For this reason, to merely shift the start of appliances to the time when demand is expected to drop as indicated in FIGS. 2A and 2B or when the rates drop as provided in a time of use rate system could result in a new peak demand, at least within the residence 106 or the community 104 that adopts such an approach. Instead, it is beneficial to provide controlled start or curtailment of devices so as to stagger the operation and produce the lower maximum demand 230. This not only affects the efficiency of the energy supply for the community 104 but the maximum energy level for which the wiring and other systems in the home are designed.

The energy provider 102 may be in the best position to know the available supply of energy. Based on this, the energy provider 102 conventionally has served as the primary decision maker in decisions such as energy consumption curtailment, load balancing, and peak limitations. Energy management systems where the energy saving decisions are primarily in the hands of the energy provider 102 may be thought of as a centralized intelligence energy management system. Under a centralized intelligence system, each home within a community may be charged an energy tariff according to the average energy use of the homes within that community. Under such a system, individual homes that do not exceed the off-peak energy demand of, for example, 5 kW per hour, during on-peak periods may still be charged at on-peak rates. Thus, there is little incentive for a home under such a system to manage their energy demand to remain below 5 kW per hour, for example.

Individual consumers may be in the best position to know which energy consuming devices the consumer needs or can do without. Surveys have shown that energy providers would find it very desirable to distribute the decision to save energy to consumers. Part of the reason for this is that the energy providers provide incentives to consumer to manage their energy demand to remain below the 5 kW per hour in the example of FIG. 2A.

Figure 3:
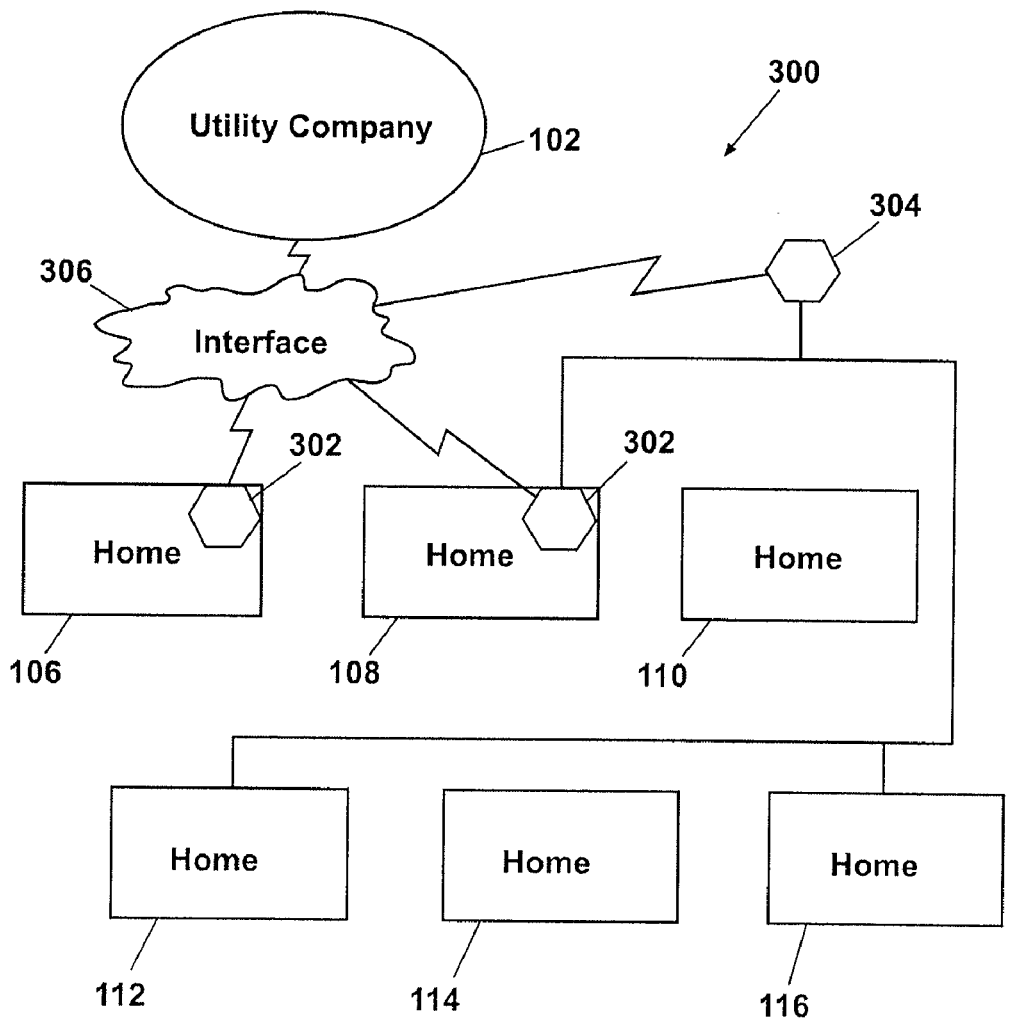
FIG. 3 is a schematic diagram of a distributed intelligence energy management system according to the present invention at a community level.

FIG. 3 is a schematic diagram of a distributed intelligence energy management system 300. Included within the distributed intelligence energy management system 300 may be one or more home energy controllers 302 and one or more energy demand controllers 304. Also included within the distributed intelligence energy management system 300 may be an interface 306.

Each home energy controller 302 and each energy demand controller 304 may be programmed with instructions that decide whether to accept or reject energy delivered by the utility company 102. The instructions also may allocate that accepted energy to various energy consuming devices within the home. For example, the consumer may select an energy consuming device from all the energy consuming devices in the home to modify the energy usage of the selected device with an overall goal to reduce energy.

The interface 306 may be any network or interconnected system of networks. The interface 306 may pass communications between the energy provider 102, each home energy controller 302, and each energy demand controller 304. An example of the interface 106 may be the Internet.

In the distributed intelligence energy management system 300, primary control over energy consumption curtailment, load balancing, and peak limitations may be distributed from the energy provider 102 to an individual consumer through the home energy controller 302. As shown in FIG. 3, the consumers of homes 106 and 108 each maintain a home energy controller 302 to manage their energy consuming devices. A group of consumers may come together as a consumer cooperative so that energy management decisions may be performed by the consumer cooperative.

As shown in FIG. 3, the consumers of home 108, home 112, and home 116 manage their energy consuming devices through the energy demand controller 304. Home 110 and home 114 are shown not participating in the distributed intelligence energy management system 300 and thus may be subject to the energy tariff schedule of a centralized intelligence energy management system. Moreover, the consumer of home 108 may experience the greatest cost savings by maintaining the consumer's home energy controller 302 in communications with the energy demand controller 304.

Figure 4:
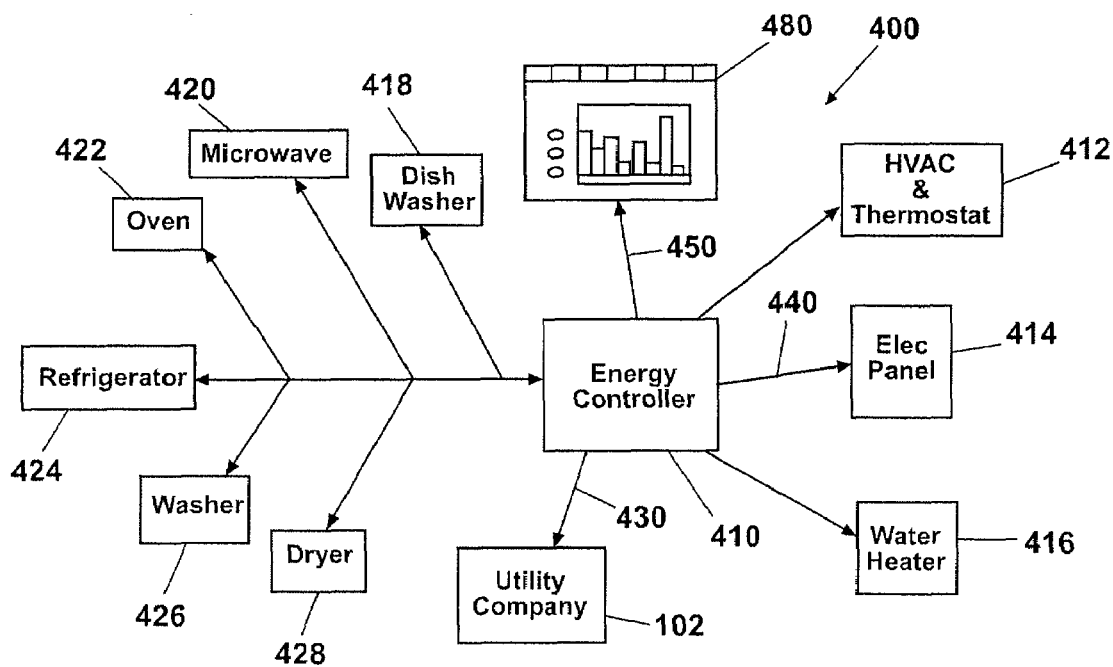
FIG. 4 is a schematic diagram of a distributed intelligence energy management system according to the present invention at a single residence level.

In the single residence intelligence energy management system 400, which may function with or without a coordinated community level energy management system, energy primary control over energy consumption curtailment, load balancing, and peak limitations may be distributed from the energy provider 102 to an individual consumer through the home energy controller 410, as shown in FIG. 4 The energy controller 410 controls a plurality of energy consuming devices within the residence including appliances and fixtures. For example, the energy controller 410 can control the environmental conditioning fixtures and appliances in the home such as the HVAC and thermostat 412. It may control water quality devices such as the water heater 414, or a water softener (not shown) or water purifier (not shown). Similarly, the energy controller 410 can control food preservation appliances, food preparation appliances and cleanup appliances such as a dishwasher 418, a microwave oven 420, a combination oven and range 422, a refrigerator 424, an automatic clothes washer 246 and a clothes dryer 428.

The energy controller 410 may communicate as shown at data exchange channel 430 directly with the utility company directly or may communicate with an intermediate service provider, or with a community controller or manager. As will be described herein in further detail, among the information exchanged with the utility company or intermediate service provider may include projected consumption data, rate data, curtailment data, brownout warnings, and emergency condition information.

The energy controller 410 may exchange with the controlled devices 412 through 428, as shown at exemplary data exchange channel 440, different types of information depending on the capability of the controller and the device. It is contemplated that the data may include control data, requests for power, grant of power, order of curtailment, status inquiry, status cycle data, device type data, and other demand management data.

It is contemplated that some devices controlled by the energy controller 410, such as lights, may not be inherently intelligent devices. However, such devices may still be controlled by the energy controller 410 by having an intelligent device associated with such device supplying power to such device, such as an intelligent electrical panel 414.

In the preferred embodiment, the energy controller 410 further exchanges data along a data channel 450 with a user interface 480, which may be integrated with the controller, separate and disposed locally with the controller or disposed remotely from the controller. The user interface 480 may be used for the direct entry of configuration data, such as types of devices, user preferences, rate schedules, household status (such as vacation mode) and for providing the user with current and/or historical energy usage data.

FIGS. 6A through 6E provide examples of graphical information and user inputs that may be displayed by the user interface 480.

The energy supplier 102 or some other business may participate directly as a primary decision maker in the distributed intelligence energy management system 300 or 400. For example, the energy supplier 102 may operate the energy demand controller 304 or 410. The energy supplier 102 may also participate indirectly. For example, the energy supplier 102 may supply information such as time-of-day pricing structures to each home energy controller 302 and each energy demand controller 304.

Basing the energy rate or tariff for an individual home 106-116 on the average actions of the community, the consumer may incur a charge from the energy provider 102 for that energy at the going rate of the energy for the community 104.

The system permits the user to manage the energy demand to instantaneous peak caused by activating significant energy consuming devices surge. For example, the system permits a consumer to manage usage from 8 KW down to 5 KW so as to remain within an off-peak energy demand rate. The system also accounts for an instantaneous energy draw or surge of power demand that may move the consumer's immediate energy usage from the non-peak rates to the on-peak rates. This may occur, for example, where a consumer starts a clothes washer when both the clothes dryer and dishwasher are operating. The effect may be an instantaneous peak caused by activating significant energy consuming devices surge.

The system may account for staged restrictions. The restrictions may be applied differently depending on, for example, the appliances involved and the consumer's preference. Thermal energy storage systems may be incorporated into the system. The system may simultaneously use energy supplier rate data and consumer preferences to control attached energy consuming devices.

The system may account for the use of tokens. A token is different from a restriction since a token may be viewed as permission to take a power surge where a restriction is the prevention of taking a power surge. A token may give a consumer permission to contribute to the on-peak period at off-peak rates.

As an output of the system, the energy management system may be used with a backup generator to manage surges and manage appliance usage. For example, the consumer may prioritize the sources of energy for the home or for particular energy consuming devices. Sources of energy for the home may include a remote power supplier, a home generator, home solar panels, and the like. The consumer may, under some circumstances, engage the generator and disengage drawing from the remote energy provider.

The system may respond to shutoff signals, pause signals, and restriction signals. The system may make smart selection and interpretation between shutoff and pause signals. A shut off command may turn the energy consuming device off. A pause command may cause the system to literally pause, even if there is water in the system being run. The system may then recognize that the system cannot pause over a certain time frame given the water in the system condition. The system may cycle to shutoff if the pause is greater than a predetermined period.

For example, if an icemaker is filling up and the system receives a shutoff signal half way through the icemaker fill cycle, the system is configured to recognize the action being taken by the icemaker as one that needs little energy and will last a short time. Recognizing this, the system will delay the shutoff cycle until the icemaker fills. As another example, the system may recognize that a clothes washer may be operating in a drain cycle, the system may delay any shutoff until the water in the clothes washer is drained.

A specific aspect to the system is that there may be a plurality of inputs into a device that may make curtailment decisions to produce a variety of outputs to one or more energy consuming devices that are selected from at least two choices to control two curtailment levels. One curtailment level may be a shut off, another curtailment level may be a pause, a third curtailment level may be a reduced power, such as to 70% normal operating power.

The system may be configured to make smart interpretations for a plurality of descriptions that may be received from a power company in view of other factors, such as specific curtailment instructions, signals that might vary depending on the type of device to which it is sending that signal. Moreover, the energy consuming device attached to the system may or may not respond in a smart way to that signal.

As noted above, a token may be permission to surge and momentarily use a lot of energy where a coupon may be permission to use a lot of energy over a period of time. A restriction may reward with a rebate for those consumers responding to the restriction. Moreover, there may be penalties for not complying with a restriction.

The system may curtail the smarter devices, and self manage the controlled devices.

A power plant may respond intelligently to data collected from each controller on the system. The house may confirm the power company's projection of power consumption and in the present form contingent projections based on the current power consumption levels such as through an instantaneous negotiation between the power company and a home or the collective of homes.

The system encompasses an entire bartering structure such as used on websites like eBay.com where a consumer's home offers to buy energy for a given price.

Energy management inputs to the system may include, restriction data, rate date, consumer preferences, device status, time (clock), geographic basis (neighborhood), consumer account status, local conditions such as the weather, coupons, tokens, modes, rewards, advisories, and restrictions. Energy modes may include indications that the consumer is at home, away at work or on vacation, that there is a break in (refrigerator door opened while in away mode), opt-out, and/or Sabbath mode. Signals from one home device may activate or contribute to the control over another energy consuming device.

Pricing information may be set by the energy provider 102 utilizing a variety of factors. For example, the energy provider 102 may use time of day, season, such as summer, fall, or winter, brownouts.

In operation, the system may shift approximately 212 KWh per month for each home from on-peak periods to off-peak periods. For example, a dishwasher typically runs five loads a week for a total energy usage of about 120 KWh energy per month. A clothes washer typically consumes about 70.0 kWh of energy per month. With the approximately 130.0 kWh of energy per month utilized by an electric clothes dryer, a home typically utilizes 320 kWh of energy per month through a dishwasher, a clothes washer, and a clothes dryer. Typically, the timing of the operation of a dishwasher, a clothes washer, or a clothes dryer is not critical. Thus, the system provides setting inputs that operate the time of use for a dishwasher, a clothes washer, or a clothes dryer. By setting the time of use for these appliances to an off-peak period, the consumer may shift 320 kWh of energy per month from the on-peak period to the off-peak period.

The system works to provide automatic management of energy consuming devices to both reduce energy peak demand (consumption) and reduce energy cost for the energy consumer. By combining rate data, demand management input from the power utility and consumer, a system having a controller connected to energy consuming devices may manage energy demand in a way that saves money for the consumer as well as controlling energy demand in accordance with power utility needs. For example, the energy controller may schedule devices for savings in utility rate plans and control peaks by managing concurrency and enabling energy restrictions and emergencies with minimal impact to the consumer.

The system may include a mechanism to receive energy data directly from a utility company or other off-site data center to automate synchronization with utility rates, plans, and incentives. In one embodiment, the consumer may view current and past energy consumption patterns on a display device and observe savings and potential savings in their consumption of energy. The energy controller may be configured to manage energy consuming devices automatically with little or no impact to the consumer lifestyle. Further savings are enabled whereby the consumer may optionally enroll in rate reductions through special energy management programs offered by their local utility company. These may include curtailment options and rate incentives for peak management automation.

Anyone, such as a consumer, employing the system may control energy consumption to allow the consumer to operate equipment at a time of day that is most favorable for cost structures and energy demand management. Through the system, the consumer may limit, control, and manage peak energy demands. The consumer may achieve this by orchestrating the power consumption and concurrency of operation for the energy consuming equipment under the control of the energy management controller module. The consumer may schedule or reschedule energy consuming devices to manage energy costs and consumption. Through the system, the consumer may include the ability to set energy management control parameters (both wired and wirelessly) from remote locations.

The system may include a security interface that may be designed for access by an energy provider or other involved party. The security interface may permit the third party to interface with one of the controllers in the system. The system may include software that permits a user to download energy pricing structure and other information into a controller. The controller may be configured to utilize the information to manage the facility's power consumption.

A third party, such as an energy provider, may access the system to curtail energy demand during high use or emergency situations without regard for those specific energy consuming devices that will be affected. The controllers may be configured to limit, reschedule, or stop energy consuming devices based on real-time information updated from either the consumer or the energy provider.

The system may further include an interface that permits communication with both intelligent and non-intelligent energy consuming devices. This may allow a consumer to coordinate energy consumption management features built into the individual control systems of consumer appliances, HVAC equipment, water heaters, and any other powered device.

The system further may be configured to permit a consumer to establish energy restrictions and device priorities to suit the individual needs and preferences of the consumer.

Figure 5:
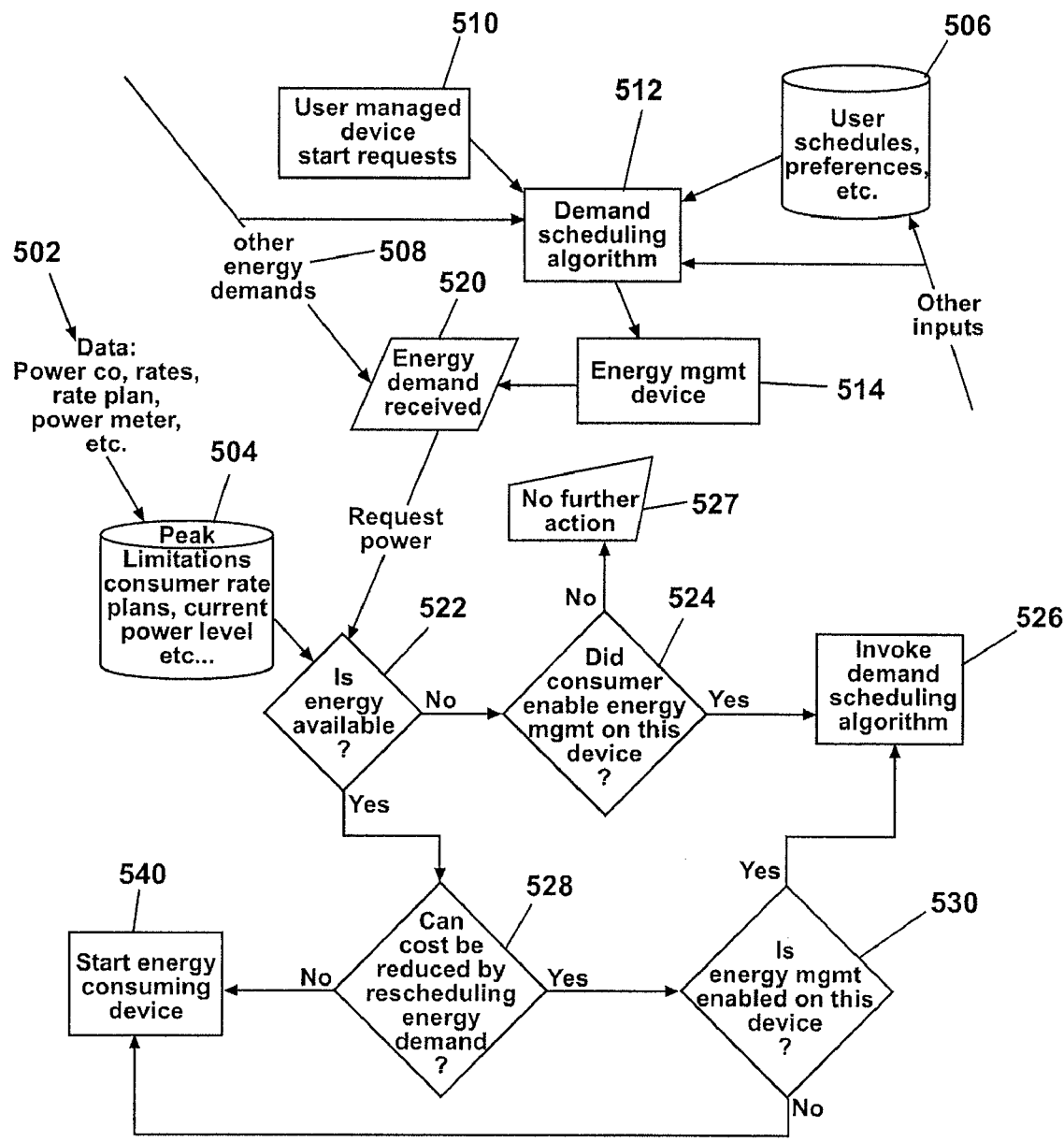
FIG. 5 is a flow diagram of an example of the logical structure of an intelligent energy management system according to the present invention.

FIG. 5 illustrates an example of the operation of the residential controller 302 according to the preferred embodiment of the present invention.

Various inputs are provided to the controller from time to time from the power company at 502 or from an intermediate service provider at 504, as described in greater detail above herein, informing the controller about the availability and cost of power, as well as emergency and special conditions. Similarly, inputs are provided to the controller 302 from time to time at 506 from the user, smart appliances and others, as described in greater detail above herein, including user preferences, device types, household status or mode.

The controller 302 monitors the status of energy demands in the residence. Where there is a controller 304 at the community level, the controller 302 optionally also monitors community energy demands.

When a user managed energy consuming device requests power at 510, the controller schedules operation of the device at 512 to a control algorithm and, when scheduled, initiates a request for operation of the device at 514. Alternatively, a request for immediate power may originate at 508 directly from an automatic device, such as a HVAC fan or a lighting timer, or from a user operated device, such as a light switch.

The request for power from a managed device at 514 or from an unmanaged device at 508 is received by the controller at 520. The controller decides at 522 if power is available, as defined by user preferences received at 506 and based on data from the energy supplier or intermediate vendor received at 504. If power is deemed not available, the controller checks at 524 to determine if the consumer enabled energy management for the device, in which case the controller runs at 526 the appropriate scheduler to reschedule operation of the device. If the power is deemed not available at 522 and energy management is found at 526 to not be enabled, then the controller will not provide power to the device as shown at 527.

Unmanaged devices are started at 540 if energy is deemed available.

Even if energy is deemed available at 522, however, the energy controller 302 preferably determines at 528, based on demand side data such as user inputs and supply side data such as energy supplier data, whether cost can and should be reduced by rescheduling operation. Managed devices are redirected at 530 to invoke the demand scheduling algorithm at 526.

Figure 6A:
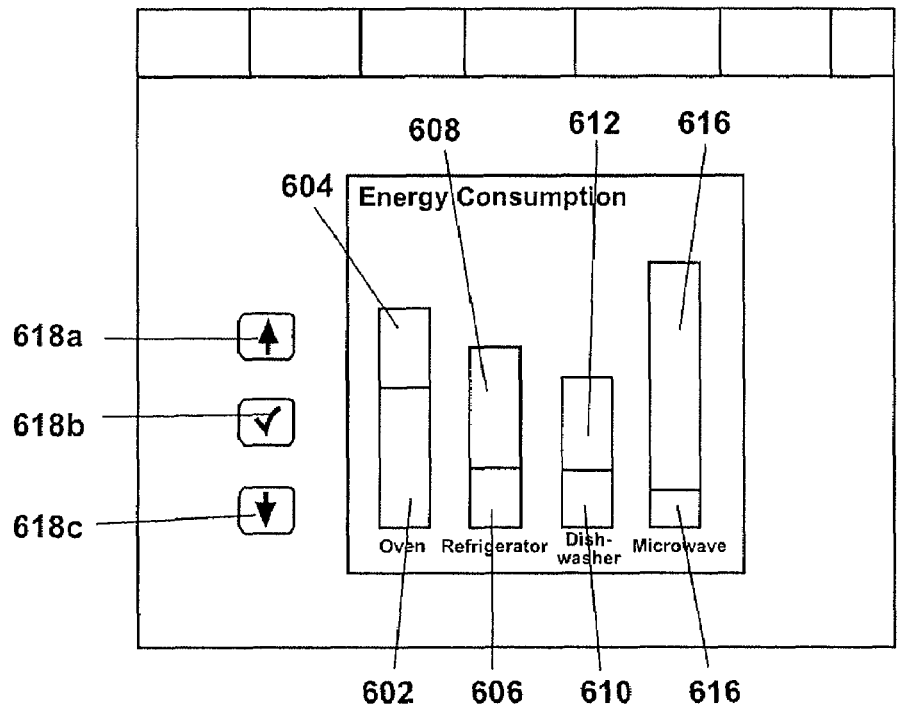
FIGS. 6A through 6E are screen shots of a display device illustrating an example of the optional historical data output of the preferred version of the controller of the present invention.
Figure 6B:
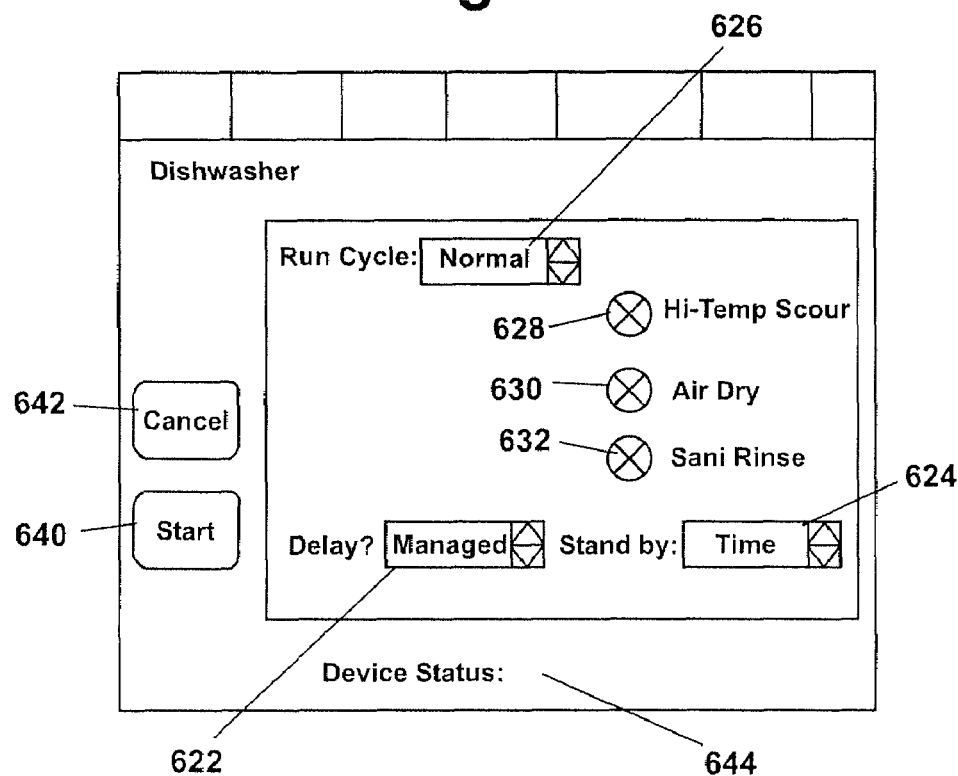
Figure 6C:
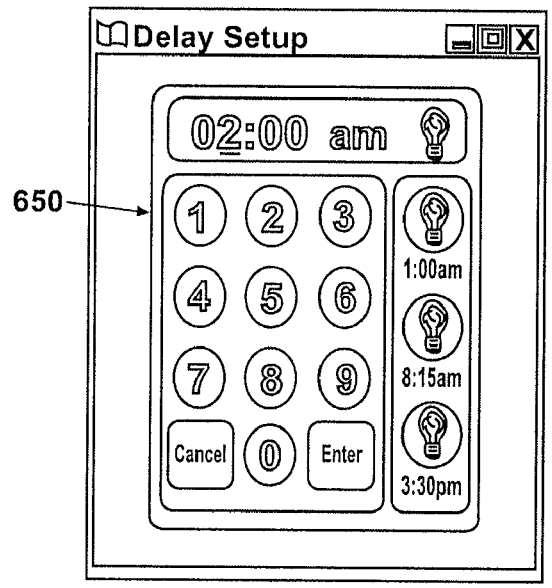

Refer now to FIGS. 6A through 6C illustrating various graphical displays for a user interface for a total home energy management system.

FIG. 6A graphically displays exemplary bar graph showing, for example, by device, how much power was consumed by various household appliances controlled by the energy controller 302. For example, stacked bars 602 and 604 could illustrate how much energy was consumed by the oven at peak rate and at a lower rate respectively over some designated time period. Similarly, stacked bars 606 through 616 could illustrate power consumed at two or more rates for the refrigerator, dishwasher and microwave oven. Hypertext buttons 618a, 618b, and 618c, permit navigation to different power consuming devices and different time periods.

FIG. 6B illustrates an exemplary input screen for user managed control of a energy consuming device, such as a dishwasher in the example illustrated. The screen provides for the selection of managed control at 622 or alternatively the input of a proposed start time at 624 as well as selection of a cycle at 626 and subcycle parameters at 628, 630 and 632. The screen also has hypertext buttons 640 and 642 to start and cancel operation as well as a display of operational status of the device at 644.

FIG. 6C illustrates a timer 650 in window format for direct input of a delay time for operation of a managed device.

Figure 6E:
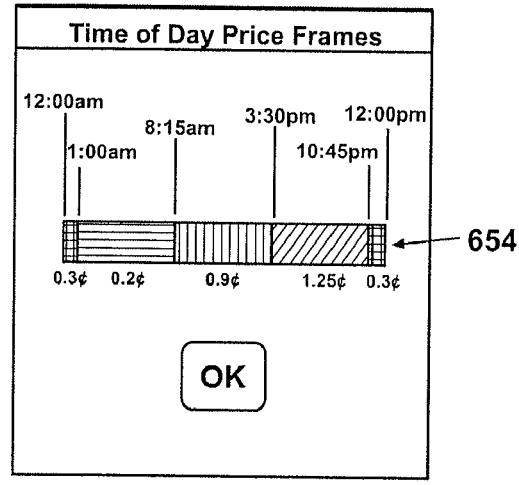
Figure 6D:
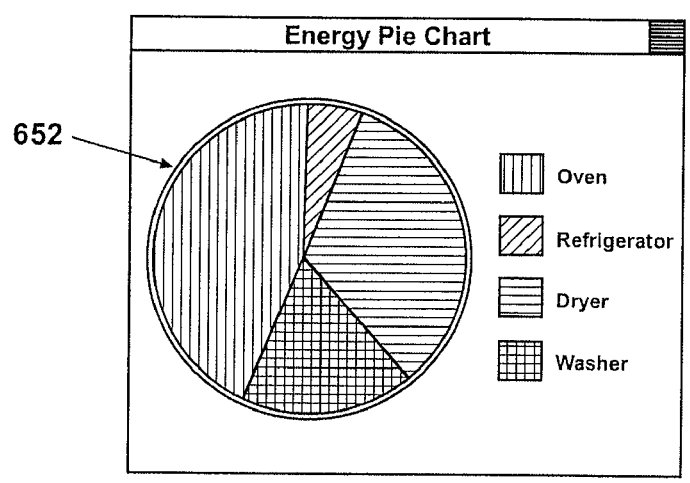

FIG. 6D illustrates, in window format, a pie chart 652 comparing the cost of operation of various selected appliances that are managed by the controller 302.

FIG. 6E provides a graph 654 illustrating time of use billing to facilitate desired consumer to shift energy consumption to non-peak and therefore lower cost times.

The energy management system of the present invention therefore allows consumers to take advantage of rate based incentive programs and to cooperate with emergency curtailment and setback programs. It further allows such incentives to be more flexibly offered and timed, or even automated, since their acceptance can be automated in the residential controller, thereby making the entire energy supply and distribution system more responsive to changing conditions to control peaks and reduce the need for adverse curtailments.

With an energy controller according to the present invention, the consumer can seamlessly enfold energy management into their lifestyle, schedule appliance usage with energy managed automation, view current and past energy consumption history, participate in special rate plans with their power utility with minimal inconvenience, participate in energy management as desired, and override at will. The energy controller will manage home energy consumption considering data from energy provider device and family schedules, personal energy preferences including Time of Use (TOU), price incentives, restrictions in effect, max and peak limitation incentives, emergency restrictions, and other incentives.

The system permits a consumer to select the consumer participation level in those energy demand management incentives provided by an energy provider. Under certain circumstances, a consumer may dynamically opt out of energy curtailment for either individual appliances or equipment and for part or all of the entire curtailment period. The system is configured to permit a consumer to participate in community energy rate incentive programs to optimize energy and financial benefits. The system could be flexible enough to permit a consumer to manage the consumer's concurrency of energy demand to maintain the total instantaneous energy demand below target levels. Through the system, the consumer may target a maximum level of instantaneous energy demand established by the energy provider. The system also is flexible enough to automatically receive and process updates sent from an energy provider to a controller of the system. An overall effect is that the system works to maximize benefits of an energy price structure where cost of energy is determined by the time of day when the energy is consumed.

The present invention has been described utilizing particular embodiments. As will be evident to those skilled in the art, changes and modifications may be made to the disclosed embodiments and yet fall within the scope of the present invention. The disclosed embodiments are provided only to illustrate aspects of the present invention and not in any way to limit the scope and coverage of the invention. The scope of the invention is therefore to be limited only by the appended claims.

What is claimed is:

1. A method for managing the supply of energy to a plurality of energy consuming devices connected to a power distribution system of an energy supplying system, comprising:
   receiving an energy demand request associated with an energy consuming device in need of energy at an electronic controller;
   receiving energy supply data including energy cost rate data from an energy provider at the controller which provides for differing cost rates at different times throughout the day;
   the electronic controller deciding whether the energy supply is to be utilized by the energy consuming device making an energy demand request immediately or at a delayed time based on the energy demand request and the energy supply data; and
   the electronic controller connecting the energy supply to the energy consuming devices at the decided time to minimize the cost of the supplied energy.

2. The energy managing method of claim 1, where the plurality of energy consuming devices are located within a single residence.

3. The energy managing method of claim 1, where the plurality of energy consuming devices are located within a plurality of residences.

4. The energy managing method of claim 3, and further comprising:
   providing a plurality of home energy controllers and an energy demand controller, each house includes a home energy controller in communication with a plurality of energy consuming devices, and
   the energy demand controller is located remote from a plurality of houses and is in communication with each of the plurality of home energy controllers.

5. The energy managing method of claim 1 wherein at least one of said energy consuming devices is selected from a group consisting of a cooking appliance, a dishwashing appliance, a fabric care appliance, a food preservation appliance, a water management appliance, an electrical panel, and an air control appliance.

6. The energy managing method of claim 1 further comprising:
   receiving community energy data from an energy supplier, and
   controlling the energy supply to selectively provide energy to fewer than all of the energy consuming devices to reduce a level of energy demand on an energy supply source in response to said community energy data.

7. The method according to claim 1 further comprising:
   controlling the energy supply to the energy consuming devices to reduce the peak energy load.

8. The method according to claim 7 wherein the control of energy to the energy consuming device is staggered to reduce the peak energy load.

9. The method according to claim 1 further comprising:
   controlling the energy supplied by controlling the level of energy supplied.

10. The method according to claim 9 wherein the level of energy supplied is one of supplying normal energy levels, supplying reduced energy levels, and supplying no energy.

11. The energy managing method of claim 1 further comprising:
    receiving device specific data from at least one of said energy consuming devices, and
    controlling the energy supply to selectively provide energy to fewer than all of the energy requesting devices to reduce a level of energy demand on an energy supply source in response to said device specific data.

12. The energy managing method of claim 1 further comprising:
    receiving device user data from a source of the user data, and
    controlling the energy supply to selectively provide energy to fewer than all of the energy requesting devices to reduce a level of energy demand on an energy supply source in response to the user data.

13. An energy management system for managing a plurality of energy consuming devices connected on a power distribution system of an energy supplying system, comprising:
    a logical communication device associated with at least one of the energy consuming devices to generate an energy demand request; and
    a controller in logical communication with the energy supplying system to receive energy supply data including energy cost rate data which provides for differing cost rates at different times throughout the day from the energy supplying system, in logical communication with the logical communication device to receive the energy demand request, and configured to control the supply of energy to the at least one of the energy consuming devices between a current time and a future time by making an energy supply decision based on the energy supply data including energy cost rate data and the energy demand request to minimize the cost of the supplied energy.

14. The energy management system of claim 13 wherein said controller further comprises input means for user input of at least one type of user data selected from a group consisting of household status data, personal preference data, and specific data relating to a curtailable device, said energy management system further comprising:
    said controller being adapted to process said energy supply data, and said user data to selectively generate a logical command to curtail power to said curtailable device.

15. The energy management system of claim 14 wherein said logical communication device is adapted to provide device data selected from a group consisting of device type data, current device operational status data, device specific curtailment preference data, request for power data, and alternative cycle data, said energy management system further comprising:

said controller being adapted to process said energy supply data, said user input data and said device data to selectively generate a logical command to curtail power to said curtailable device.

16. The energy management system of claim 13 wherein said logical communication device further is adapted to provide device data selected from a group consisting of device type data, current device operational status data, device specific curtailment preference data, request for power data, and alternative cycle data, said energy management system further comprising:

a curtailable device being one of the energy consuming devices; and said controller being adapted to process said energy supply data, and said device data to selectively generate a logical command to curtail power to said curtailable device.

17. The energy management system of claim 16 wherein:

said device data further comprises said alternative cycle data, and said controller selectively generates a logical command comprising a curtailment command or an alternate cycle command.

18. The energy management system of claim 13 wherein at least two of said energy consuming devices are curtailable devices.

19. The energy management system of claim 13 wherein the at least one energy consuming device is selected from a group consisting of a cooking appliance, a dishwashing appliance, a fabric care appliance, a food preservation appliance, a water management appliance, an electrical panel, and an air control appliance.

20. The energy management system of claim 13 wherein said controller is further adapted to collect energy use data from said power distribution system.

21. The energy management system of claim 13 wherein the plurality of energy consuming devices comprise a logical communication device that generates an energy demand request and the controller is configured to control the supply of energy to the plurality of energy consuming devices based on the energy demand requests and the energy supply data.

22. The energy management system of claim 13 wherein the controller is configured to control the supply of energy to the plurality of energy consuming devices to reduce the peak energy required.

23. The energy management system of claim 22 wherein the controller is configured to stagger the supply of energy to the plurality of energy consuming devices to reduce the peak energy required.

24. The energy management system of claim 13 wherein the controller controls the energy supplied to the at least one of the energy consuming devices by controlling the level of energy supplied.

25. The energy management system of claim 24 wherein the level of energy supplied is one of a normal energy supply level, a reduced energy supply level, and no energy supplied level.

26. The energy management system of claim 13 wherein the energy supply data comprises at least one of a current energy rate data, scheduled energy rate data, curtailment request data, emergency curtailment demand data, invitation to consume energy, consumption delay request data, request for projected energy usage.

* * * * *